US009068713B2

(12) United States Patent
Yang

(10) Patent No.: US 9,068,713 B2

(45) Date of Patent: Jun. 30, 2015

(54) DEW CONDENSATION DELAY DEVICE OF HEAD LAMP FOR VEHICLE

(75) Inventor: Jeong Gyu Yang, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 483 days.

(21) Appl. No.: 13/316,375

(22) Filed: Dec. 9, 2011

(65) Prior Publication Data

US 2013/0070470 A1 Mar. 21, 2013

(30) Foreign Application Priority Data

Sep. 20, 2011 (KR) ........................ 10-2011-0094847

(51) Int. Cl.

*B60Q 1/00* (2006.01)
*B60Q 3/00* (2006.01)
*F21S 8/10* (2006.01)

(52) U.S. Cl.

CPC ............. *F21S 48/335* (2013.01); *F21S 48/328* (2013.01)

(58) Field of Classification Search

CPC ........ F21S 48/328; F21S 48/335; F21S 48/34

USPC ......... 362/459, 464, 475, 480, 507, 547, 546, 362/520

See application file for complete search history.

(56) References Cited

U.S. PATENT DOCUMENTS 6,179,456 B1 * 1/2001 Nakamura et al. ............ 362/510

FOREIGN PATENT DOCUMENTS

| | | | |
|---|---|---|---|
| JP | 2001-527635 | A | 12/2001 |
| KR | U1994-016497 | Y1 | 7/1994 |
| KR | 10-2008-0003991 | A | 1/2008 |
| KR | 10-2009-0089386 | A | 8/2009 |
| KR | 10-0934501 | B1 | 12/2009 |
| KR | 10-2011-0015300 | A | 2/2011 |

* cited by examiner

*Primary Examiner* — Stephen F Husar
*Assistant Examiner* — Danielle Allen
(74) *Attorney, Agent, or Firm* — Morgan, Lewis & Bockius LLP

(57) ABSTRACT

A dew condensation preventing device of a head lamp for a vehicle may include a housing forming a head lamp for the vehicle and having a lens mounted on a front end portion thereof, and a Phase Change Material (PCM) unit, mounted on the housing, for preventing dew from condensing on the lens when an internal temperature of the head lamp is lowered, thereby improving the merchantable quality and the safety when the vehicle is driving.

3 Claims, 3 Drawing Sheets

DEW CONDENSATION DELAY DEVICE OF HEAD LAMP FOR VEHICLE

CROSS-REFERENCE TO RELATED APPLICATION

This application is based on and claims priority from Korean Patent Application No. 10-2011-0094847 filed Sep. 20, 2011, the entire contents of which application is incorporated herein for all purposes by this reference.

BACKGROUND OF INVENTION

1. Field of Invention

The present invention relates to a dew condensation preventing device of a head lamp for a vehicle, and more particularly, to a dew condensation preventing device of a head lamp which can prevent dew from condensing on an inner surface of a head lamp lens installed at both left and right head lamp housings of a vehicle.

2. Description of Related Art

In general, head lamps for vehicles are mounted at front left and right sides of vehicle bodies to emit the light from the lamps in a forward direction of the vehicle so that a driver can safely drive the vehicle at night. In particular, the light is emitted forward to obtain a field of vision in the forward direction of the vehicle when driving at night or in rain.

FIG. 1 is a view illustrating a head lamp for a vehicle in the related art.

In the head lamp for the vehicle in the related art, as shown FIG. 1, it is preferable that a head lamp 2 installed to the vehicle is maintained in a clean state in which dew does not condense on the lens cover of the head lamp. However, the dew condenses on the inner surface of the head lamp lens due to a temperature difference between inner and outer portions of the head lamp 2.

In order to remove the dew condensed on the inner surface of the head lamp lens, various methods have employed in the art. For example, a head lamp housing is provided with a vent, or is provided with a moisture absorbent, thereby removing moisture. Alternatively, a lens of the head lamp is applied by a hydrophilic coating so that even though dew condenses on the lens, it cannot be seen.

The head lamp for the vehicle in the related art has some problems in that, since the method of evaporating the moisture through heat transfer caused by convection utilizes the heat generated from a bulb, which is installed to the head lamp, as an energy source capable of moving inner air, a separate device is necessary to forcefully move the air; in the case of introducing air, alien substances such as dust flow in to decrease the emitting ability of the head lamp; in the case of utilizing the moisture absorbent, the moisture absorbent is saturated, the function of absorbing the moisture is lost; and in the case of applying the hydrophilic coating to the lens of the head lamp, the cost is increased, and the hydrophilic capability is lost when a lot of moisture condenses.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for a dew condensation preventing device of a head lamp for a vehicle which can prevent dew from condensing on an inner surface of a head lamp lens installed at both left and right head lamp housings of the vehicle.

Various aspects of the present invention provide for a dew condensation preventing device of a head lamp for a vehicle including a housing forming the head lamp for the vehicle and having a lens mounted on a front end portion thereof, and a Phase Change Material (PCM) unit, mounted on the housing, for preventing dew from condensing on the lens when an internal temperature of the head lamp is lowered.

The PCM unit may be mounted on an inner side of the housing, and is located at a position close to the lens.

In addition, a case may be provided at an outer side of the PCM unit, and a latent heat material, which is a phase change material, is provided in the case.

Furthermore, the heat latent material of the PCM unit may consist of single or plural compounds.

With the above configuration, the dew condensation preventing device of the head lamp for the vehicle according to the present invention can prevent dew from condensing on the lens when an internal temperature of the head lamp is lowered, thereby improving the merchantable quality and the safety when the vehicle is driving.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
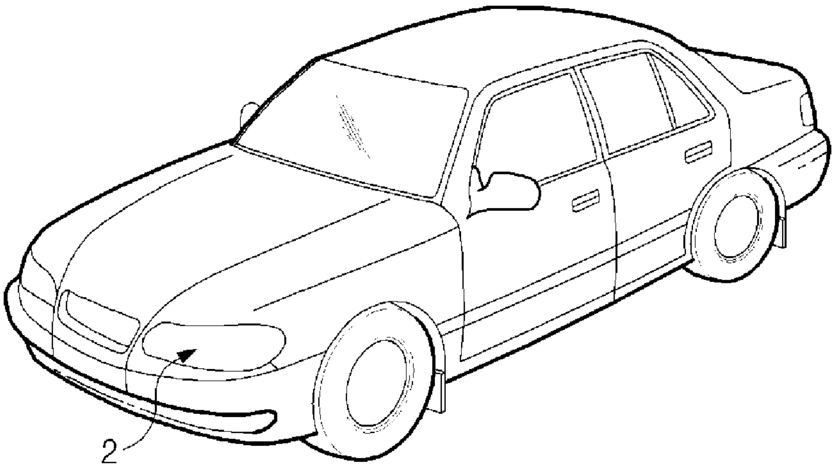
FIG. 1 (Related Art)
FIG. 1 is a view illustrating a head lamp for a vehicle in the related art.
Figure 2:
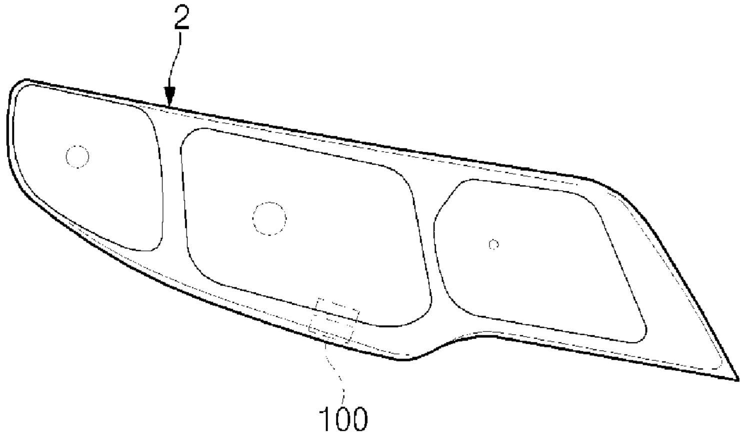
FIG. 2 is a front view illustrating an exemplary dew condensation preventing device of a head lamp for a vehicle according to the present invention.
Figure 3:
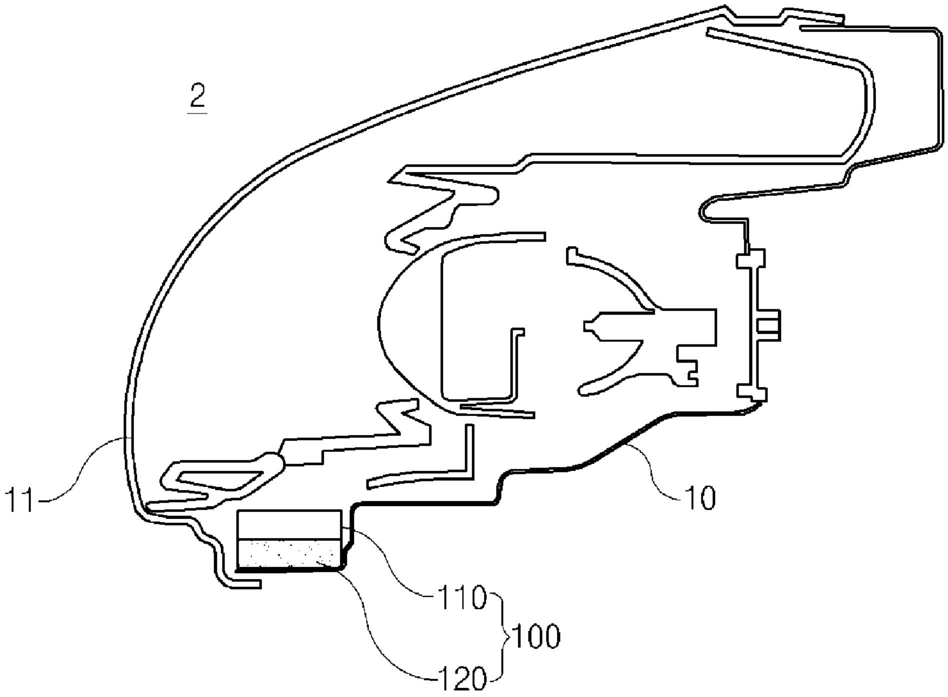
FIG. 3 is a cross-sectional view illustrating an exemplary dew condensation preventing device of the head lamp for the vehicle according to the present invention.
Figure 4:
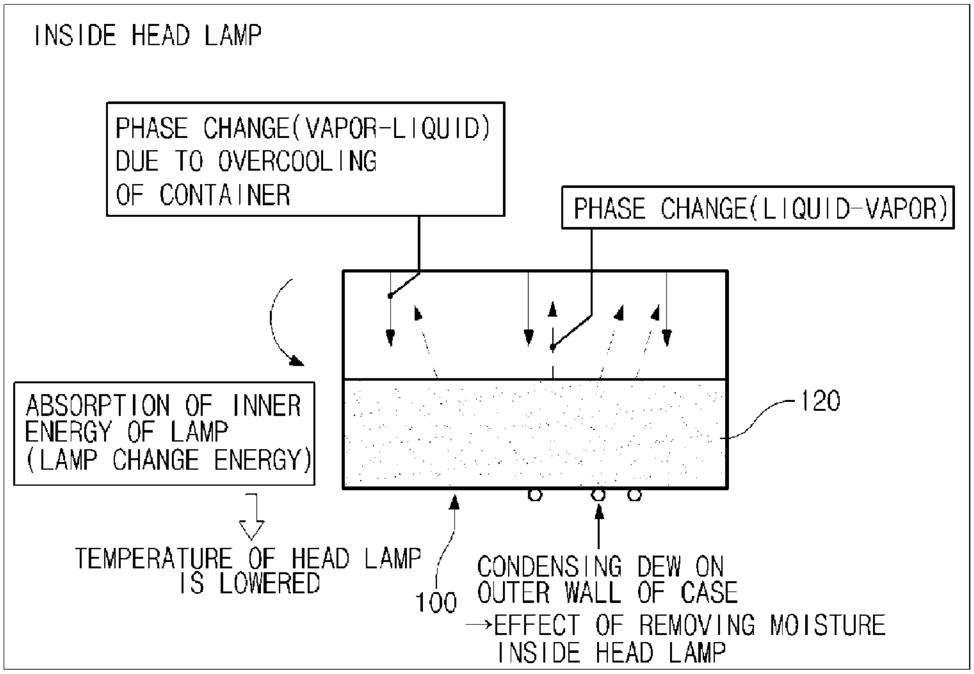
FIG. 4 is a view illustrating a phase state occurring in an exemplary dew condensation preventing device of the head lamp for the vehicle according to the present invention.

FIGS. 2 to 4 show a dew condensation preventing device for a vehicle according to the present invention. FIG. 2 is a front view illustrating the dew condensation preventing device of the head lamp for the vehicle according to the present invention. FIG. 3 is a cross-sectional view illustrating the dew condensation preventing device of the head lamp for the vehicle according to the present invention. FIG. 4 is a view illustrating a phase state occurring in the dew condensation preventing device of the head lamp for the vehicle according to the present invention.

The dew condensation preventing device of the head lamp for the vehicle according to the present invention includes, as shown in FIGS. 2 to 4, a housing 10 forming a head lamp 2 for the vehicle, and a Phase Change Material (PCM) unit 100, mounted on the housing 10, for preventing dew from condensing on a lens 11. The dew condensation preventing device prevents the dew from condensing on the surface of the lens 11 of the head lamp, thereby improving the merchantable quality and the safety when the vehicle is driving.

Each component of the dew condensation preventing device of the head lamp for the vehicle according to the present invention will now be described in detail with reference to the accompanying drawings.

First, the dew condensation preventing device includes the housing 10 forming the head lamp 2 for the vehicle, and the PCM unit 100 mounted on the housing 10.

The housing 10 is mounted on the front of the vehicle to form the external appearance of the head lamp 2. In various embodiments, it may be preferable that the housing 10 is provided at its front with the lens 11 to emit the light from the head lamp 2 to the exterior via the lens 11.

The Phase Change Material (PCM) unit 100 is mounted on the housing 10 to prevent the dew from condensing on the lens 11 when the internal temperature of the head lamp 2 is lowered.

In this instance, it may be preferable that a case 110 is provided at the outer side of the PCM unit 100, and a latent heat material 120, which is a phase change material, is provided in the case 110.

The heat latent material 120 of the PCM unit 100 consists of single or plural compounds which can be subjected to phase change.

The PCM unit 100 may be mounted on the inner side of the housing 10, and is located at a position close to the lens 11 to prevent the dew from condensing on the lens 11.

The operation and effect of the present invention will now be described.

As shown in FIGS. 2 and 3, the dew condensation preventing device of the head lamp for the vehicle according to the present invention includes the housing 10 forming the head lamp 2 for the vehicle, and the PCM unit 100, mounted on the housing 10, for preventing the dew from condensing on the lens 11. The PCM unit 100 is maintained at a temperature which is lower than that of the surface of the lens 11 mounted on the head lamp 2 by using a principle in which the dew condenses when the internal temperature of the head lamp 2 lowers below a dew point. The PCM unit 100 is mounted at an invisible region inside the head lamp 2 to forcibly condense the dew, thereby suppressing the dew from condensing on the surface of the lens 11 of the head lamp 2 which is a visible region.

In this instance, since the PCM unit 100 is provided with the latent heat material 120, which is the phase change material, in the interior thereof, as shown in FIG. 4, to condense the dew. The phase change evaporation temperature of the PCM unit 100 is set below the dew point temperature at which the dew condenses on the lens (if the dew point temperature is 20° C., the evaporation temperature of the PCM unit is set to 10° C.). Therefore, when the internal temperature of the head lamp is raised above the evaporation temperature of the PCM unit 100, the latent heat material 120 inside the PCM unit 100 is changed in phase to absorb the energy inside the head lamp and thus prevent the internal temperature of the lamp from being raised.

The temperature of the PCM unit 100 is constantly maintained due to the phase change of the latent heat material 120. After the head lamp is turned off and then cooled, the PCM unit 100 is maintained at a temperature lower than that of the lens surface, so that the dew first condenses on the PCM unit 100 to prevent the dew from condensing on the lens of the head lamp.

The PCM unit 100 is fixedly mounted on the inside of the housing 10 of the head lamp, and is located at the position close to the lens to maximize the suppression of dew condensation on the lens 2.

The evaporated latent heat material 120 can be used semi-permanently since it is recycled through repetition of phase change.

With the above configuration, the dew condensation preventing device of the head lamp for the vehicle according to the present invention includes the housing forming the head lamp for the vehicle and having a lens mounted on a front end portion thereof, and the PCM unit, mounted on the housing, for preventing dew from condensing on the lens when an internal temperature of the head lamp is lowered, thereby improving the merchantable quality and the safety when the vehicle is driving.

For convenience in explanation and accurate definition in the appended claims, the terms front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dew condensation delay device of a head lamp for a vehicle comprising:

a housing forming the head lamp for the vehicle and having a lens mounted on a front end thereof; and a phase change material (PCM) unit, mounted on the housing, for delaying dew from condensing on the lens when an internal temperature of the head lamp is lowered;

wherein a case is provided at an outer side of the PCM unit and mounted to the housing, and a latent heat material is provided in the case, wherein the latent heat material is a phase change material in which a phase change evaporation temperature of the PCM unit is set below a dew point temperature at which the dew condenses on the lens.

2. The dew condensation delaying device according to claim 1, wherein the PCM unit is mounted on an inner side of the housing, and is located adjacent the lens.

3. The dew condensation delaying device according to claim 1, wherein the heat latent material of the PCM unit consists of single or plural compounds.

* * * * *